United States Patent [19]

Yokoyama et al.

[11] Patent Number: 5,651,953

[45] Date of Patent: Jul. 29, 1997

[54] METHOD OF PRODUCING HYDROGEN FROM BIOMASS

[75] Inventors: Shinya Yokoyama; Tomoko Ogi; Tomoaki Minowa; Seiichi Inoue, all of Tsukuba, Japan

[73] Assignee: Director-General of Agency of Industrial Science and Technology, Japan

[21] Appl. No.: 501,145

[22] Filed: Jul. 11, 1995

[30] Foreign Application Priority Data

Aug. 25, 1994 [JP] Japan .................................. 6-200552

[51] Int. Cl.$^6$ ....................................................... C01B 3/02
[52] U.S. Cl. ........................................................ 423/648.1
[58] Field of Search ........................................... 423/648.1

[56] References Cited

PUBLICATIONS

Kawai et al. "Production of Hydrogen and Hydrocarbon from Cellulose and Water" Chemistry Letters 1981 pp. 1185–1188 no mt/81.

Vasilakos et al. "Homogenous Catalytic Hydrogenolysis of Biomass" Ind. Eng. Process Des. Dev. 1984 vol. 23 pp. 755–763 no mt/84.

Yokoyama et al. "Efficient Catalytic Gasification of Cellulose for Production of Hydrogen and Carbon Monoxide" Chemistry Letters 1983 pp. 151–154 no mt/83.

*Primary Examiner*—Wayne Langel
*Attorney, Agent, or Firm*—Lorusso & Loud

[57] ABSTRACT

Hydrogen is produced from a cellulose-containing biomass by heating the biomass in the presence of water and a catalyst at a temperature of 250°–374° C. and at a pressure higher than the saturated vapor pressure of water. The catalyst includes a catalytic metal selected from the group consisting of nickel, iron, cobalt, molybdenum, tungsten, platinum and mixtures thereof.

5 Claims, No Drawings

METHOD OF PRODUCING HYDROGEN FROM BIOMASS

BACKGROUND OF THE INVENTION

This invention relates to a method of producing hydrogen from a cellulose-containing biomass.

One known method for the production of hydrogen from wood chips includes subjecting the wood chips to water gas shift reactions in which the wood chips are converted into hydrogen and carbon monoxide and the carbon monoxide in turn is converted into hydrogen and carbon dioxide. Since the above reactions should be performed at a high temperature of about 1,000° C., it is a general practice to burn part of the wood chips to supply the heat for the reactions. Thus, the efficiency of the above method is not satisfactory. Further, the above method is not applicable to a wet cellulose-containing biomass.

SUMMARY OF THE INVENTION

It is, therefore, an object of the present invention to provide a method which can produce hydrogen from a cellulose-containing biomass at a temperature much lower than that used in the conventional method.

Another object of the present invention is to provide a method of the above-mentioned type which can be adopted to a water-containing biomass.

In accomplishing the foregoing objects, the present invention provides a method of producing hydrogen from a cellulose-containing biomass, comprising heating said biomass in the presence of water and a catalyst at a temperature of 250°–374° C. and at a pressure higher than the saturated vapor pressure of water, wherein the catalyst includes a catalytic metal selected from the group consisting of nickel, iron, cobalt, molybdenum, tungsten, platinum and mixtures thereof.

Other objects, features and advantages of the present invention will become apparent from the detailed description of the preferred embodiments of the invention to follow.

DETAILED DESCRIPTION OF THE PREFERRED EMBODIMENTS OF THE INVENTION

In accordance with one embodiment of the present invention, cellulose-containing biomass is heat-treated in an autoclave in the presence of water and a metal catalyst at a temperature of 250°–374° C. and a pressure higher than the saturated vapor pressure of water.

The term "cellulose-containing biomass" used in the present specification is intended to refer to various kinds of materials containing cellulose. Examples of the cellulose-containing biomass include wood, wood chips, wood powder, bark, baggasse, bamboo, wastes of agricultural products, paper, peat, sewage, soil, city wastes and other cellulose-containing waste materials.

The metal catalyst may be Fe, Ni, Co, Mo, W, Pt and Cu. A supported catalyst containing a porous carrier and the above catalytic metal supported thereon may also be suitably used. Illustrative of suitable carriers are silica, alumina, silica-alumina, zirconia, titania, zeolite, sepiolite, kieselguhr (diatomacous earth) and clay. The catalyst is generally used in an amount of 0.01–10 parts by weight, preferably 0.1–1 part by weight, per part by weight of the cellulose-containing biomass on the dry basis.

Water is generally present in an amount of 2–100 parts by weight, preferably 4–10 parts by weight, per part by weight of the cellulose-containing biomass on the dry basis.

The heat treatment is performed at a temperature of 250°–374° C., preferably 300°–370° C., at a pressure higher than the saturated water vapor pressure at the heat treatment temperature. The treatment time is generally 5–180 minutes. If desired, an oxygen-free gas such as nitrogen, argon, helium or carbon dioxide may be used to maintain the desired treatment pressure. In such a case, the autoclave containing the biomass is pressurized at 10–50 atm with the oxygen-free gas before heating to the treatment temperature. An organic solvent such as an alcohol, a ketone or a phenol compound may be present in the reaction system.

The heat treatment may be carried out in a batch system or in a continuous system. While the catalytic metal is gradually inactivated with an increase of a process time due to coking, the poisoned catalyst may be regenerated by burning the coke deposits, followed by reduction with hydrogen.

The following examples will further illustrate the present invention.

EXAMPLE 1

A supported catalyst containing about 50% by weight of nickel supported on a diatomaceous earth carrier was used as the metal catalyst. Prior to use, the nickel catalyst was reduced with hydrogen gas. A mixture of 5 g of cellulose, 30 ml of water and a quantity of the nickel catalyst as shown in Table 1 was charged in an autoclave (inside volume: 0.1 liter), to which nitrogen gas was charged so that the pressure within the autoclave was increased to 30 atm. Then the autoclave was heated to 350° C. at a rate of about 10° C./minute so that the pressure within the autoclave was autogeneously increased to above 170 atm (above the saturated water vapor pressure). The autoclave was then maintained at 350° C. for 60 minutes and, thereafter, cooled to room temperature. The gas phase in the autoclave was analyzed by a gas chromatography to measure the amount of hydrogen produced. The results are summarized in Table 1 together with the recovery of hydrogen from the cellulose and the concentration of hydrogen in the gas phase.

TABLE 1

| Amount of Ni Catalyst (g) | 0 | 0.1 | 0.2 | 0.5 | 1 |
|---|---|---|---|---|---|
| Amount of $H_2$ (mmol) | 1 | 11 | 22 | 54 | 113 |
| Recovery of $H_2$ (%) | 0.5 | 7 | 14 | 33 | 70 |
| Concentration of $H_2$ (vol %) | 4 | 26 | 37 | 48 | 50 |

EXAMPLE 2

A supported catalyst containing about 50% by weight of nickel supported on a diatomaceous earth carrier was used as the metal catalyst. Prior to use, the nickel catalyst was reduced with hydrogen gas. A mixture of 3 g of cellulose, 30 ml of water and 0.6 g of the nickel catalyst was charged in an autoclave (inside volume: 0.1 liter), to which nitrogen gas was charged so that the pressure (initial pressure) within the autoclave was as shown in Table 2. Then the autoclave was heated to 350° C. at a rate of about 10° C./minute so that the pressure within the autoclave was autogeneously increased. Whether the pressure (treatment pressure) was increased above 170 atm (saturated wave vapor pressure) or not was checked. The autoclave was then maintained at 350° C. for 60 minutes and, thereafter, cooled to room temperature. The gas phase in the autoclave was analyzed by a gas chromatography to measure the amount of hydrogen produced. The results are summarized in Table 1 together with the recovery of hydrogen from the cellulose and the concentration of hydrogen in the gas phase.

TABLE 2

| Initial Pressure (atm) | 0 | 5 | 10 | 30 | 50 |
|---|---|---|---|---|---|
| Treatment Pressure* | no | no | yes | yes | yes |
| Amount of $H_2$ (mmol) | 10 | 16 | 43 | 43 | 49 |
| Recovery of $H_2$ (%) | 10 | 16 | 44 | 44 | 51 |
| Concentration of $H_2$ (vol %) | 24 | 25 | 49 | 52 | 50 |

*: no . . . the treatment pressure is less than 170 atm
yes . . . the treatment pressure is more than 170 atm The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A method of producing hydrogen from a cellulose containing biomass, comprising the steps of:

pressurizing an autoclave containing said biomass, water and a catalyst with an oxygen-free gas to 10–50 atm, said catalyst including a catalytic metal selected from the group consisting of nickel, iron, cobalt, molybdenum, tungsten, platinum and mixtures thereof, said catalytic metal being supported on a porous carrier and present in an amount of 0.1–10 parts by weight per part by weight of said biomass on the dry basis; and then heating said biomass in said autoclave at a temperature of 250°–374° C. and a pressure higher than the saturated vapor pressure of water and for a period of time sufficient to decompose said biomass and to form hydrogen.

2. A method as claimed in claim 1, wherein said carrier is at least one member selected from the group consisting of silica, alumina, silica-alumina, zirconia, titania, zeolite, sepiolite, diatomacous earth and clay.

3. A method as claimed in claim 2, wherein said catalytic metal is at least one element selected from the group consisting of iron, cobalt and nickel.

4. A method as claimed in claim 1, wherein said oxygen-free gas is selected from the group consisting of nitrogen, argon, helium and carbon dioxide.

5. A method as claimed in claim 1 wherein the yield of hydrogen is at least 11 mmol per 5 g. cellulose.

* * * * *